United States Patent Office 3,186,950
Patented June 1, 1965

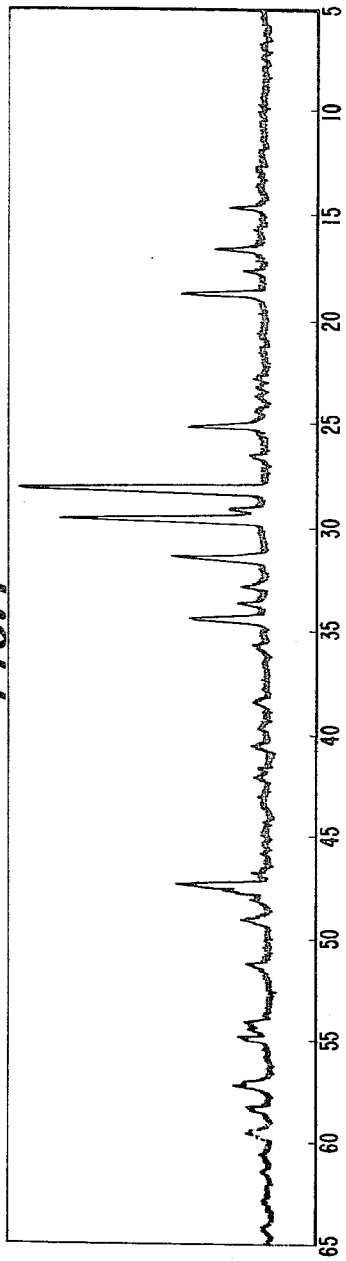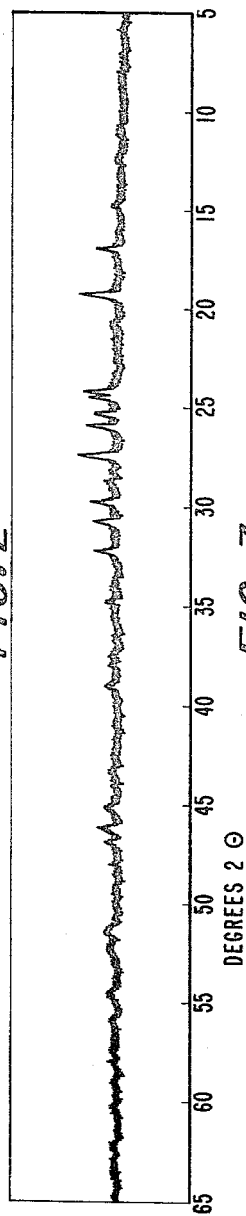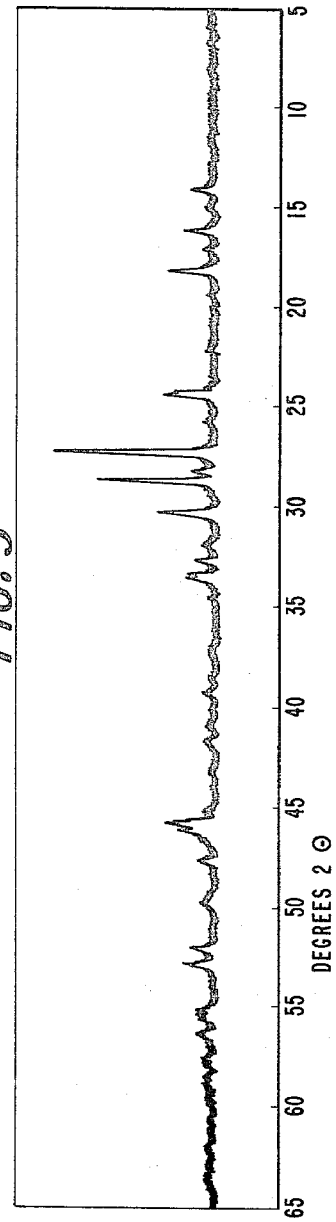
INVENTOR
HANS J. BORCHARDT

3,186,950
RARE EARTH TUNGSTATE AND MOLYBDATE LUMINOPHORS
Hans J. Borchardt, Liftwood Estates, Wilmington, Del., assignor to E. I. du Pont de Nemours and Company, Wilmington, Del., a corporation of Delaware
Filed Apr. 30, 1962, Ser. No. 191,249
10 Claims. (Cl. 252—301.5)

This invention relates to chemical compositions and, more particularly, to luminescent compositions.

Luminescent materials, including phosphorescent and fluorescent materials, have found wide acceptance in the art in such uses as TV tubes, fluorescent lights, radiation detectors, radarscopes, and other detection devices. Such luminescent materials, that is, luminophors, emit radiation, for example, visible radiation, on excitation with ultraviolet light, X-rays, cathode rays, and the like. Examples of such commercial luminophors are calcium tungstate, copper-activated zinc cadmium selenide, barium-lead sulfate, silver-activated zinc sulfide, titanium-activated alkaline earth selenides and manganese-activated zinc-beryllium silicates.

Commercial luminophors have been subject to several limitations. First, they are hypersensitive to impurities. Not only does such sensitivity present problems as far as use is concerned, but in addition, it presents great problems in the preparation of the luminophors. Small portions of impurity materials introduced either during use or during preparation—markedly alter the luminescence of such commercial luminescent materials. Second, some luminophors, such as selenides and arsenides, are highly toxic and thus create hazards during processing and potential hazards in use.

Rare earth elements have been used in the preparation of luminescent materials. In the art, such rare earth elements have been used as activators, that is, they have been used as intentionally added "impurity" materials. For example, alkaline earth silicates have been activated with minute quantities of rare earth elements. The characteristic feature of such prior art luminophors is that the minute quantities of rare earth activator incorporated therein are employed to produce band emission by causing defects in the host crystal lattice and emission from the defective region in the vicinity of the "impurity" atoms.

Optimum luminescent properties are conventionally obtained in phosphors with proportions of activating material on the order of 0.0001 to 0.01 mole of activator per mole of base material. In general, with conventional phosphors, increasing the proportion of the "impurity" activator decreases luminescent intensity, and in some cases, quenches it. Conventional rare earth activated luminophors quench out quite rapidly when the rare earth activator concentration is increased to levels in excess of one mole percent because of activator-activator interaction.

In accordance with this invention, it has been discovered that a unique group of materials emit exceptionally bright green light on excitation, are easy to prepare and are remarkably insensitive to impurities both during preparation and use; hence, the aforementioned materials are eminently suited for use in luminescent coatings, compositions and luminescent articles fabricated therefrom.

The luminescent materials of this invention consist essentially of substantially colorless luminophor of the formula:

$$(RE_{1-x}Tb_x)_2O_3 \cdot 3MO_3$$

wherein the RE component is at least one rare earth element selected from the group consisting of scandium yttrium, lanthanum, samarium, gadolinium, dysprosium, and lutetium, about from 25 to 100 mole percent of RE being selected from the group consisting of scandium, yttrium, lanthanum, gadolinium and lutetium, $x$ is 0.03 to 1.0 and M is selected from the group consisting of tungsten and molybdenum. The preferred luminescent materials of this invention consist essentially of luminophor of the above formula wherein $x$ is 0.1 to 0.8. As indicated by the above formula, such preferred luminophors are solid solutions of a terbium component with a cognate RE component. Not only are such preferred luminophors less expensive than other luminophors of this invention such as $Tb_2O_3 \cdot 3WO_3$ and $Tb_2O_3 \cdot 3MoO_3$, but, in addition, give superior performance and are the brightest luminophors.

Luminescent articles of this invention comprise (a) at least one of the aforementioned luminescent materials, optionally in admixture with other luminescent materials, intimately associated with (b) a protective layer of a material transparent to radiation emitted by the aforementioned luminescent materials.

As indicated above, scandium and yttrium, as well as lanthanum, samarium, gadolinium, terbium, dysprosium, lutetium are considered as rare earth elements herein. The terms "anion" and "cation" as used herein are used to describe the stoichiometry of the solid solutions comprising the luminophors employed in this invention, but not necessarily the precise bonding of the elements in such solid solutions.

The luminophors of this invention are prepared by intimately mixing a rare earth compound containing terbium as the cationic (i.e., rare earth) specie, preferably at least one other rare earth compound containing one of the rare earth elements in the aforementioned RE component as the cationic species and, in most cases, a tungstate or molybdate yielding ingredient, and heating the resulting mixture in a non-reducing atmosphere such as air, at a temperature of at least about 700° C. and usually at about 900° C. to 1000° C., but below the fusion temperature of the mass, for a period usually of at least 30 minutes, and preferably about from 1 to 4 hours.

As stated hereinbefore, the preferred luminophors of this invention are solid solutions. They can be viewed as solid solutions of a terbium compound and at least one cognate compound of a rare earth element of the aforementioned RE component. Stated differently, they can be viewed as a crystal lattice of at least one of lanthanum, gadolinium, lutetium, scandium and yttrium tungstate ($\cdot 3WO_3$) or molybdate ($\cdot 3MoO_3$) and where, optionally a portion of the foregoing rare earths are replaced by dysprosium or samarium to an extent not in excess of about 75%, in which atoms of terbium are substituted for the aforementioned rare earth elements. Preferably, the luminophors of this invention consist of only one phase. However, they can contain more than one phase of the aforementioned formula. The critical factor is that the terbium be present either in solid solution with the cognate RE component or as $Tb_2O_3 \cdot 3WO_3$ or $Tb_2O_3 \cdot 3MoO_3$. The term "luminophor" is used herein in both the singular and plural to describe the luminescent materials in the compositions of this invention, including those containing one, two, or more Tb-containing solid solution phases.

As noted hereinbefore, the terbium in the luminophors of this invention constitutes at least about 3%, and up to 100% of the total rare earth ions, that is, the total of terbium and the rare earth ions in the RE component. In the solid solution luminophors of this invention luminescence goes through a maximum at about equimolar amounts of the two rare earth components. Generally, at least about 10 percent of terbium is preferred for optimum brightness of emission. The particular amount of terbium which is present in the solid solution luminphors of the compositions of this invention depends to a large extent upon the other rare earth elements in the second rare earth component with which it is associated, and to some extent upon the particular oxygen-containing anion species which is present. For example, lanthanum or gadolinium tungstate and terbium tungstate are isostructural and form substantially one phase systems at terbium concentrations of about 3 to 80%. On the other hand, in yttrium-, scandium-, or lutetium-terbium luminophors, most of which are not isostructural, a second phase usually forms at substantially above the foregoing minimum terbium concentrations. Thus, the solid solution luminophors of this invention are solid solutions of a terbium tungstate or molybdate and at least one cognate RE tungstate or molybdate, the percentage of terbium being greater than about 3 mole percent based on the total rare earth ions present, the maximum terbium concentration being no greater than the maximum solubility of the terbium component in the RE component in the solid solution in which it is contained.

Illustrative solid solutions comprising the luminophors of this invention are:

$(La_{1-x}Tb_x)_2O_3 \cdot 3WO_3$ with $X=0.05$ to $0.5$
$(Gd_{1-x}Tb_x)_2O_3 \cdot 3WO_3$ with $X=0.05$ to $0.75$
$(Y_{1-x}Tb_x)_2O_3 \cdot 3WO_3$ with $X=0.1$ to $0.2$
$(Sc_{1-x}Tb_x)_2O_3 \cdot 3WO_3$ with $X=0.1$ to $0.2$
$(Lu_{1-x}Tb_x)_2O_3 \cdot 3WO_3$ with $X=0.1$ to $0.2$
$(Gd_{1-x}Tb_x)_2O_3 \cdot 3MoO_3$ with $X=0.1$ to $0.2$
$(Y_{1-x}Tb_x)_2O_3 \cdot 3MoO_3$ with $X=0.1$ to $0.2$
$(La_zSc_yTb_x)_2O_3 \cdot 3WO_3$
$(La_zY_yTb_x)_2O_3 \cdot 3MoO_3$
$(La_zGd_yTb_x)_2O_3 \cdot 3WO_3$
$(La_zLu_yTb_x)_2O_3 \cdot 3MoO_3$
$(Y_zLu_yTb_z)_2O_3 \cdot 3WO_3$
$(Sc_zLu_tTb_x)_2O_3 \cdot MoO_3$
$(Sc_zY_yTb_x)_2O_3 \cdot 3WO_3$
$(Sc_zGd_yTb_x)_2O_3 \cdot 3WO_3$
$(Y_zGd_yTb_x)_2O_3 \cdot 3WO_3$
$(Gd_zLu_yTb_x)_2O_3 \cdot 3MoO_3$ where $x$, $y$ and $z$ are $0.2$ to $0.5$ and $x+y+z=1$.

The luminophors employed in the compositions of this invention and described above can be characterized by conventional X-ray powder diffraction techniques. X-ray spectra can be conveniently determined on a Norelco X-ray diffraction unit using a recording spectrometer, $CuK_\alpha$ radiation, 1% slits, a nickel filter and a scan rate of 1° of $2\theta$/min. If greater resolution is desired, a Guinier camera can be employed.

The X-ray patterns of each of the families of the solid solution luminophors employed in this invention are characteristic thereof and are different from the patterns of both the individual components in the solid solutions and the reactants leading to their formation. For instance, the diffraction patterns are different for solid solutions of La-Tb tungstates as compared to the pattern for lanthanum and terbium tungstate alone. Similarly, if $(La_{0.5}Tb_{0.5})_2O_3 \cdot 3WO_3$ is prepared by reaction of lanthanum oxide, terbium oxide and tungsten trioxide, the resulting pattern of the product of this reaction will be different from that of either terbium oxide, lanthanum oxide or tungsten trioxide. In a given series of solid solutions differing only in terbium concentration, the X-ray patterns of the series will be substantially similar differing only in a slight and gradual shift in the characterizing peaks as the terbium concentration increases.

As has been noted hereinbefore, in many cases a one-phase luminophor is obtained with all terbium concentrations within the limits specified hereinbefore, while with other luminophors, a new phase appears at the limit of solubility of terbium in the crystal lattice. The presence of this new phase is indicated by the appearance of a new X-ray pattern impressed upon that of the first and characteristic of that of the new phase. Thus, the maximum solubility of the terbium tungstate or molybdate in any cognate RE component is readily determined from the proportions of materials employed in preparing the composition in which the new phase first appears, that is, the appearance of the new phase indicates that composition in which solubility is just exceeded.

As examples of luminophors of the present invention, FIGURE 1 gives the X-ray diffraction pattern of $Tb_2O_3 \cdot 3WO_3$ FIGURE 2 gives the X-ray diffraction pattern of $Tb_2O_3 \cdot 3MoO_3$ FIGURE 3 gives the X-ray diffraction pattern of $(La_{0.9}Tb_{0.1})_2O_3 \cdot 3WO_3$ From these figures it can be seen that the pattern of $Tb_2O_3 \cdot 3WO_3$ has disappeared from the $(La_{0.9}Tb_{0.1})_2O_3 \cdot 3WO_3$ thus indicating formation of a different phase.

As is recognized in the art, X-ray powder patterns may not reveal the presence of a phase unless about 5% of that phase is present. Accordingly, it is possible, though not likely, that stated formulae indicated herein may deviate by an amount consistent with the aforementioned limitation and should be so interpreted.

As stated hereinbefore, the products of this invention are prepared by mixing starting materials comprising a terbium component and a second rare earth component, the starting materials including, either as separate component or as part of the rare earth components, a component which contributes tungstate or molybdate, and thereafter heating the resulting mixture at elevated temperatures. As indicated hereinbefore, a reaction temperature of at least about 700° C., and usually at least about 900° C., is employed; however, since the reaction time decreases as the reaction temperature increases, to insure complete reactions in practical periods of time, high reaction temperatures approaching, e.g., within 100° C. of, but in any case below, the temperature at which localized fusion of the reaction mass begins are preferred. If relatively low-melting eutectics are formed during the reaction, it may be desirable to heat the reaction mixture for a period at, e.g., 700–900° C., then regrind the resulting product and finish the reaction at a higher temperature.

The rare earth components are preferably introduced into the reaction mixture as oxides. However, rare earth components which decompose to the oxide on heating, for example, rare earth hydroxides, oxalates, carbonates, citrates, acetates and tartrates can be employed. The oxyanion-contributing component also is preferably introduced in the form of an oxide such as, for example, tungstic oxide or molybdic oxide. However, the oxyanion-contributing reactant need not be necessarily in the form of an oxide. It can be, for example, in the form of a compound such as tungstic acid, molybdic acid, or ammonium tungstate, which on ignition is converted to the oxide. Alternatively, although less preferred, the solid solutions can be prepared by mixing each of the "preformed" components of the solid solution and heating at elevated temperatures. For example, the luminophor $(La_{0.5}Tb_{0.5})_2O_3 \cdot 3WO_3$ can be prepared from equimolar quantities of lanthanum tungstate $(La_2O_3 \cdot 3WO_3)$ and terbium tungstate $(Tb_2O_3 \cdot 3WO_3)$. Reactants are preferably introduced in the form of finely ground particulate material, preferably having a particle size of less than 10 microns.

The quantities of reactants employed in preparing the luminophors of this invention are preferably approximately stoichiometric based on the desired composition of the final product. If the anion contributing constituent is one which absorbs incident or emitted radiation, for example, the green colored tungstic oxide, excess of such constituent tends to yield products with somewhat decreased luminescence. Hence, although slight excesses of such reactants are tolerable, preferably slightly less than the stoichiometric amount thereof is employed. Thus, for example, to prepare products of the formula $$(RE_{1-x}Tb_x)_2O_3 \cdot 3WO_3$$

for one mole of total rare earth oxide (including terbium oxide), it is preferred to employ 2.8 to 2.9 moles of tungsten-contributing reactant. Where the oxyanion-contributing reactant is a colorless material, somewhat greater quantities of such reactant over the stoichiometric proportions, for example, 10 or 20% excess, can be tolerated, since the excess in the resulting products merely acts as an inert diluent. Normally, about 2.5 to 3 moles of oxyanion-contributing reactant per mole of total rare earth oxide is employed.

As noted hereinbefore, in some solid solution systems a second phase appears at relatively high terbium content. An excess of the terbium contributing constituent over that necessary to yield the desired luminophor can be employed, although again, stoichiometric proportions which yield compositions containing substantially only the desired luminophor are preferred. This second phase which appears after the limit of solubility of the terbium component is itself luminescent and consists essentially of terbium tungstate or molybdate; thus, substantial proportions, for example, up to 75 percent or higher of such second phase can be present without markedly reducing the luminescence of the preferred solid solution systems of this invention.

The particular combination of rare earth elements employed in the luminophors described herein and the large number of emitting terbium ions which can be and are therein yield compositions in accordance with this invention of unusual brightness. On excitation, the products of this invention emit a bright green light. Although the products of this invention all emit on excitation by ultraviolet light, the emission varies somewhat from luminophor to luminophor. For example, the luminophor $(La_{0.25}Tb_{0.75})_2O_3 \cdot WO_3$ emits a bright green under excitation by 2537 A. U.V. and a bright blue-green when excited by 3660 A. U.V. $(Gd_{0.85}Tb_{0.15})_2O_3 \cdot 3WO_3$ emits very feebly when excited by 3660 A. U.V. but 2537 A. U.V. excitation results in bright green emission.

$$(Lu_{0.9}Tb_{0.1})_2O_3 \cdot 3WO_3 \text{ and } (Y_{0.95}Tb_{0.05})_2O_3 \cdot 3WO_3$$

retain most of their luminescence to 200° C. when excited by 2537 A. U.C. whereas $(La_{0.25}Tb_{0.75})_2O_3 \cdot 3WO_3$ and $(Cd_{0.85}Tb_{0.15})_2O_3 \cdot 3WO_3$ rapidly quench out at temperatures considerably below this.

In addition to the foregoing, the products of this invention are remarkably insensitive by luminophor standards to impurities, both during preparation and during use.

As noted hereinbefore, the luminescent articles of this invention comprise at least one of the aforementioned luminophors, optionally in admixture with conventional luminescent materials, intimately associated or in adherent contact with a protective layer of a material transparent to radiation emitted by the aforemenioned luminophors, that is, visible, and particularly green light. The particular structure of the luminescent articles and the manner in which the luminophor is embedded therein depends to a great extent upon the utility for which such articles are to be used. The luminophor, for example, can be embedded in the transparent material, adhered to one or more surfaces thereof, combined with just sufficient binder to hold the luminophor particles together and sandwiched between two layers of transparent material, or a combination of these. More specifically, for example, in luminescent signs, the luminophor can be embedded in a polymeric material transparent to incident and emitted radiation and, for example, used as such or adhered to a signboard or the like. In fluorescent lights, the luminophor is conveniently merely adhered to the inner surface of a fluorescent light tube. In cathode ray tubes, the luminophor can be adhered to the inner surface of the glass face plate and, if desired, additional layers, for example, of polymeric material or aluminum transparent to incident radiation applied thereover.

The luminophors can be associated with one or more protective layers transparent to emitted radiation. For example, the luminophor can be combined with binder and sandwiched between two or more adherent protective layers, or the luminophor and binder therefor can be coated on the surface of a material transparent to emitted radiation. The shape of the luminescent articles is not critical. They can be flat as in luminescent signs, or curved as in fluorescent lights and cathode ray tubes, or even in the form of blocks or cubes which can be used, for example, as raised letters on signs. Examples of luminescent articles prepared in accordance with this invention are fluorescent lights; high pressure mercury vapor lamps, e.g., for street lighting; radiation detectors; luminescent signs, markers and identification devices; TV tubes, cathode ray oscillographs and other oscilloscopes; electron microscope viewing windows; luminescent sheets, films, coatings, and other shaped articles.

Examples of materials transparent to radiation emitted by the aforementioned phosphors are organic polymeric materials such as homopolymers and copolymers of alkyl acrylates and methacrylates such as methyl methacrylate; polyvinyl acetate; polyethylene; chlorosulfonated polyethylene; polypropylene; polystyrene; polyepoxides; polyesters such as polyethylene terephthalate; polyacrylonitrile; homopolymers and copolymers of vinyl chloride; polyvinyl alcohol; cellulose derivatives such as nitrocellulose and ethyl cellulose; inorganic material such as various glasses, including silicate and borate glasses, and transparent crystalline materials such as lithium fluoride and sodium chloride; as well as various compatible mixtures thereof.

The particular method of fabrication of luminescent articles is not the essence of this invention; any of the conventional techniques therefor can be employed. However by way of illustration, the luminophors mentioned hereinbefore can be finely ground and, if desired, mixed with other luminescent materials such as calcium tungstate, barium-lead sulfate, antimony- and manganese-activated calcium halophosphates, selenium-activated zinc sulfide, manganese-activated zinc orthosilicate or a mixture thereof to yield products emitting light of the desired color balance. As is conventional in the art, for example, the resulting compositions can be dispersed in a solution or dispersion of a binder, for example, a binder of one or more of the aforementioned materials transparent to emitted radiation together with any of the conventional organic or inorganic solvents or dispersants therefor. The resulting compositions then can be coated onto a surface, for example, a signboard, and solvent or dispersant evaporated therefrom to yield a luminescent coating wherein luminophor is embedded in a layer of binder transparent to incident and emitted radiation. Such dispersions of luminophor and binder can also be cast into self-supporting sheets and films.

Fluorescent lights can be prepared, for example, by milling finely divided, for example 3- to 12-micron, luminophor of this invention, together with other luminescent materials yielding the desired color balance, with low viscosity ethyl cellulose or nitrocellulose dissolved in xylol and dibutylphthalate. The resulting composition then can be applied to the inner surface of a standard fluorescent light tube, for example, by conventional flush, flow or spray methods, and dried. Finally, the coated tube can be heated to a temperature just below the melting point of the glass tube, usually a temperature greater than 700° C., to oxidize the organic binder and adhere the luminophor to the glass. The resulting product of this invention comprises a layer of luminophor adhered to the inner surface of a tubular protective layer of glass. The tubes prepared as described above can be fabricated into a finished fluorescent light by standard procedures such as, for example, those described in the "Encyclopedia of Chemical Technology," volume 8, Interscience Publishers, Inc., pages 202–206 (1952).

Cathode ray tubes can be prepared, for example, by first introducing a cushioning layer, for example, of water or a mixture of alcohol and ether, onto the inner surface face plate of the tube, then distributing, for example, spraying, a solution of the luminophor in water or alcohol over the surface of the cushioning layer and allowing the luminescent material to precipitate onto the face plate. Next, the cushioning liquid can be withdrawn from the tube and the resulting product dried. Subsequently, further coatings, for example, of sodium or potassium silicate, nitrocellulose and/or aluminum can be applied to the inner surface of the luminophor layer by conventional procedures such as those described in U.S. Patent No. 2,710,262.

The concentration of luminophor and binder used in preparing products of this invention as described above varies greatly with the particular article being fabricated. Thus, for example, in preparing luminescent coating compositions wherein the final article comprises luminophor embedded in the binder, relatively large proportions of binder are employed so that in the resulting product the binder encases and protects the luminophor. In such cases, as low as 50% or less, but usually on the order of 70 to 90% of binder based on the weight of binder and luminophor is employed. In the fabrication of fluorescent lights, the solution of binder merely serves as an application medium for the luminophor and is completely burned off during fabrication of such lights as described above. Normally, relatively dilute concentrations of binder are employed. If the luminophor is to be sandwiched between two protective layers, it may be desirable to use just sufficient binder to hold the luminophor particles together, for example, 2 to 5% based on the weight of luminophor and binder.

In the following examples which illustrate this invention, parts and percentages are by weight unless otherwise indicated. The terbium oxide used in these examples is $Tb_4O_7$. Exactly the same results are obtained if $Tb_2O_3$ is used because under the conditions of preparation the $Tb_4O_7$ decomposes to $Tb_2O_3$.

Example I

Tungstic oxide (0.9738 part), 0.4350 part of gadolinium oxide ($Gd_2O_3$) and 0.1122 part of terbium oxide ($Tb_4O_7$) are mixed on a vibrating mixer for three minutes. The reaction mixture corresponds to a mole ratio of gadolinium oxide, terbium oxide and tungstic oxide of 0.8/0.2/3.0, respectively. The resulting mixture is pressed into a pellet which is heated for four hours at 1000° C. in static air in a platinum-lined alumina boat. The resulting product consists essentially of a colorless, single solid solution phase having the formula:

$$(Gd_{0.8}Tb_{0.2})_2O_3 \cdot 3WO_3$$

In the system $(Gd_{1-x}Tb_{0.2})_2O_3 \cdot 3WO_3$ wherein $x$ is 0.20, 0.50, and 0.90, the spectral emission peaks that appear with excitation with 2537 A. radiation are as follows:

| $\lambda(A)$: | $I/I°$ |
|---|---|
| 4870 | 25 |
| 5450 | 100 |
| 5860 | 15 |
| 6210 | 15 |
| 6500 | 10 | where $x$ is 0.75 there is no marked variation in emission spectra except that the 6210 A. peak is accentuated $I/I_0=40$) and a small peak appears at 7030 A. ($I/I°=10$). Emission spectra noted in this and the following example are obtained with a Dumont type 6365 photomultiplier tube as detector and a scan between 4400 and 9200 A.

The product of this example first described above had a qualitative brilliance rating of about 5. In this qualitative scale, zero corresponds to products with no visible luminesecence, 1 corresponds to products in which luminescence is just barely visible on excitation with ultraviolet light of 2537 A., etc., and 5 corresponds to a visible brilliance comparable to the most brilliant commercial (though not necessarily green) phosphors such as barium-lead sulfates, calcium tungstates and copper-activated zinc cadmium selenides. The brilliance ratings of the products described above wherein $x=$from 0.15 to 0.75 are all 5.

Example II

A luminescent composition consisting essentially of a single solid solution phase having the formula:

$$(La_{0.8}Tb_{0.2})_2O_3 \cdot 3WO_3$$

is prepared by the general procedure described in Example 1 from 0.4171 part of lanthanum oxide, 0.1196 part of terbium oxide and 1.0387 parts of tungstic oxide. The resulting product is a bright green emitting luminophor. Similar products are obtained wherein the percent of terbium based on the total rare earth cations present is 5, 10, 20, 40 and 50%. Brilliance ratings of such products are all 5.

In the system $(La_{1-x}Tb_x)_2O_3 \cdot 3WO_3$ wherein $x$ is 0.05, 0.40, 0.75 and 0.90, the following peaks appear.

| (A.): | $I/I_0$ |
|---|---|
| 4870 | 25 |
| 5450 | 100 |
| 5860 | 15 |
| 6210 | 15 |
| 6500, barely detectable | |

For those compositions where $x$ is 0.20 and 0.50, two additional broad peaks appear, extending from 8950 to 9200 A. Their relative intensity is approximately 10.

Example III

A luminescent composition consisting essentially of a single solid solution phase having the formula $$(Y_{0.8}Tb_{0.2})_2O_3 \cdot 3WO_3$$

is prepared by the procedure described in Example I from 0.3071 part of yttrium oxide, 0.1271 part of terbium oxide and 1.1037 parts of tungstic oxide. The composition has a relative brilliance of 5 on excitation with 2735 A. ultraviolet light.

The procedure indicated above is repeated except that 1.1686 parts of tungstic oxide, 0.2234 part of scandium oxide and 0.0673 part of terbium oxide are employed. The resulting product on excitation with 2537 A. ultraviolet light has a brilliance rating of 5 and consists essentially of a single solid solution phase having the formula $$(Sc_{0.9}Tb_{0.1})_2O_3 \cdot 3WO_3$$

The procedure indicated above is again repeated except that 0.8440 part of tungstic oxide, 0.4656 part of lutetium oxide and 0.0486 part of terbium oxide are employed. The resulting product consists essentially of a single solid solution phase having the formula $$(Lu_{0.9}Tb_{0.1})_2O_3 \cdot 3WO_3$$

and has a brilliance rating on excitation with 2537 A. ultraviolet light of 5.

Example IV

A green emitting luminescent composition consisting essentially of a single solid solution phase having the formula $$(La_{0.75}Tb_{0.25})_2O_3 \cdot 3MoO_3$$

is prepared by thoroughly mixing 0.6110 part of lanthanum oxide, 0.2337 part of terbium oxide and 1.0796 parts of molybdic oxide, pressing the above finely ground mixture into a pellet and heating the resulting product in static air for four hours at 1000° C. The relative brightness rating of the resulting composition is 5 on excitation with 2537 A. ultraviolet light.

*Example V*

Molybdic oxide (0.9738 part) and terbium oxide (0.5608 part) are intimately mixed and pressed into a pellet. This pellet is heated at 900° C. for 4 hours to give a luminophor emitting green light when irradiated with 3660 A. ultraviolet radiation and white light when irradiated with 2537 A. radiation consisting essentially of a compound having the formula:

$$Tb_2O_3 \cdot 3MoO_3$$

The brilliance rating of the green radiation is 4 and of the white radiation is 3.

*Example VI*

0.1629 part of lanthanum oxide, 0.1743 part of samarium oxide, 0.1869 part of terbium oxide, and 0.973 part of tungstic oxide are pressed into a pellet and heated to 1000° C. for four hours. A single solid solution phase having the formula $$(La_{0.33}Sm_{0.33}Tb_{0.33})_2O_3 \cdot 3WO_3$$

is obtained which luminesces green when irradiated with 2537 A. ultraviolet light. The procedure given above is repeated using 0.1699 part of lanthanum oxide, 0.1813 part of gadolinium oxide, 0.9738 part of tungstic oxide, 0.1869 part of terbium oxide to give an essentially single phase green emitting luminophor having the formula $$La_{0.33}Gd_{0.33}Tb_{0.33} \cdot 3WO_3$$

The procedure above is repeated using 0.1629 part of lanthanum oxide, 0.1865 part of dysprosium oxide, 0.1869 part of terbium oxide and 0.9738 part of tungstic oxide to give an essentially single phase luminophor having the formula $$(La_{0.33}Dy_{0.33}Tb_{0.33})_2O_3 \cdot 3WO_3$$

The procedure above is repeated using 0.1813 part of gadolinium oxide, 0.1743 part samarium oxide, 0.1869 part terbium oxide and 0.9738 part of tungstic oxide to give an essentially single phase luminophor having the formula $$(Gd_{0.33}Sm_{0.33}Tb_{0.33})_2O_3 \cdot 3WO_3$$

The procedure above is repeated using 0.1813 part of gadolinium oxide, 0.1865 part of dysprosium oxide, 0.1869 part of terbium oxide and 0.9738 part of tungstic oxide to give an essentially single phase luminophor having the formula $$(Gd_{0.33}Dy_{0.33}Tb_{0.33})_2O_3 \cdot 3WO_3$$

Each of the above luminophors have a brilliance rating of 5 on excitation with 2537 A. U.V.

*Example VII*

An amount of $Tb_4O_7$ and $WO_3$ amounting to a molar ratio of the two of 1:6 are mixed into a pellet and heated at 1000° C. for 4 hours. This pellet emits green light with a brilliance of 4 when irradiated with 3660 A. radiation and white light with a brilliance of 3 when irradiated with 2537 A. radiation.

This composition has the formula $Tb_2O_3 \cdot 3WO_3$.

As noted hereinbefore, the compositions of this invention can contain binder to facilitate formation of coherent luminescent films and coating thereof, for example, in fluorescent light, TV tubes and the like. Thus, for example, the products of this and the preceding examples can be finely ground and mixed with conventional organic and inorganic phosphor binders and, usually conventional solvents for the binder, to yield compositions of this invention readily adaptable for formation into coherent luminescent sheets, films, coatings and other shaped articles. Examples of such binders include organic polymeric binders such as nitrocellulose, polymethylmethacrylate, polyvinyl alcohol and polyethylene, inorganic binders such as sodium silicate and potassium silicate and other binders which are substantially transparent to emitted radiation and do not appreciably absorb ultraviolet light or other exciting radiation if, in the article fabricated therewith, the exciting radiation must pass through an appreciable portion of such binder. The following examples illustrate preparation of luminescent compositions of this invention and articles fabricated therewith.

*Example VIII*

0.5 part of $Tb_2O_3 \cdot 3WO_3$ are added to 10 parts of a 20% solution in methyl ethyl ketone of polymethyl methacrylate and thoroughly blended to produce a homogeneous slurry. The resulting coating composition of this invention is applied to the surface of a glass plate and dried. When the glass plate is placed over a source of 2537 A. ultraviolet light with the coated surface facing the ultraviolet light source, the coating emits bright white light. The product of this invention described above consists of luminophor embedded in a protective layer of polymethyl methacrylate which is transparent to both the incident ultraviolet light and the emitted visible light and which is in adherent contact with a second protective layer of glass.

Instead of coating the luminophor above onto a glass plate, it can be coated onto a signboard, for example, of wood or metal or glass in the form of letters, numbers or designs. In a like manner, the coating composition described above can be used to laminate two layers of glass in signs, markers or other indicating devices. Similarly, other polymeric materials such as other polyalkyl acrylates or methacrylates, polystyrene or polyvinyl acetate can be substituted for the polymethyl methacrylates.

*Example IX*

0.5 part of $(La_{0.5}Tb_{0.5})_2O_3 \cdot 3WO_3$ are dispersed in a 20% solution of polymethyl methacrylate in methyl ethyl ketone and applied to the inside surface of the viewing window of an R.C.A.-type EMC electron microscope. After the coating has been dried, the window is replaced in its normal position on the electron mircroscope, the system is evacuated and the window is irradiated with cathode rays at 30 kilovolts. After a brief period, a bright green light emission is observed from the region of the viewing window where the luminophor coating is applied and irradiated with electrons.

In the example above, if an aqueous solution of an inorganic binder such as sodium or potassium silicate is employed instead of the polymethyl methacrylate solution described, similar results are obtained.

*Example X*

This example illustrates a method by which standard fluorescent lights can be prepared.

$$(Gd_{0.8}Tb_{0.2})_2O_3 \cdot 3WO_3$$

prepared as previously described is finely ground and dispersed in a dilute lacquer, for example, of nitrocellulose or ethyl cellulose. If desired, other luminophors such as manganese- and antimony-activated calcium halophosphates also can be dispersed therein. The resulting lacquer is next run through a standard glass fluorescent light tube and the coating deposited on the inside surface thereof is dried. Next, the coated tube is heated to the temperature, usually somewhat greater than 700° C., at which the cellulose lacquer is burned off and the tube somewhat softened, then the coated tube is cooled. For a standard 40-watt light (120 cm. long, 3.8 cm. dia.), about 1 to 4 grams of luminophor are deposited as just described, depending upon the particle size of the luminophor. The resulting product of this invention consists essentially of particles of luminophor firmly adhered to the inner surface of a tubular protective layer of glass. The remaining components of the fluorescent light, including the electrodes, terminals, mercury, etc., are assembled in the conventional manner.

If $(La_{0.8}Tb_{0.2})_2O_3 \cdot 3WO_3$ $(La_{0.75}Tb_{0.25})_2O_3 \cdot 3MoO_3$ or $(Y_{0.8}Tb_{0.2})_2O_3 \cdot 3WO_3$ is used instead of the luminophor of this invention, described above, substantially similar results are obtained.

I claim:

1. A luminescent material consisting essentially of substantially colorless luminophor of the formula:

$$(RE_{1-x}Tb_x)_2O_3 \cdot 3MO_3$$

wherein RE is at least one rare earth element selected from the group consisting of scandium, yttrium, lanthanum, samarium, gadolinum, dysprosium and lutetium, about from 25 to 100 mole percent of RE being selected from at least one of the group consisting of scandium, yttrium, lanthanum, gadolinium and lutetium, $x$ is 0.03 to 1.0, and M is selected from the group consisting of tungsten and molybdenum.

2. A product of claim 1 wherein $x$ is from about 0.1 to 0.8.

3. A product of claim 2 wherein RE is lanthanum.
4. A product of claim 2 wherein RE is gadolinium.
5. A product of claim 2 wherein RE is yttrium.
6. A product of claim 2 wherein RE is lanthanum and gadolinium.
7. A product of claim 2 wherein RE is lanthanum and samarium.

8. A luminescent article which comprises (a) at least one luminescent material of claim 1 intimately associated with (b) a protective layer of material transparent to radiation emitted by said luminescent material.

9. A luminescent composition which comprises (a) at least one luminescent material of claim 1 and (b) binder therefor.

10. A process for preparing luminophors which comprises heating a mixture consisting essentially of (a) terbium oxide, (b) a second rare earth oxide component consisting of at least one member of the group consisting of scandium, yttrium, lanthanum, samarium, gadolinium, dysprosium and lutetium oxides, said second oxide component containing about from 25 to 100 mole percent of at least one of the group consisting of scandium, yttrium, lanthanum, gadolinium, and lutetium oxides based on the total rare earth oxides in said second oxide component, and (c) about from 2.5 to 3 moles per mole of (a)+(b) of an oxide selected from the group consisting of $MoO_3$ and $WO_3$, at a temperature of at least about 700° C. but below the fusion temperature of the mass for at least about 30 minutes in a non-reducing atmosphere, the terbium present being at least about 3 mole percent of the total rare earth ions present.

References Cited by the Examiner

Kroger: "Some Aspects of the Luminescence of Solids," Elsevier Publishing Co., New York, 1948, pages 52, 109, 110, 291, 294, 295, 296, and 297.

MAURICE A. BRINDISI, *Primary Examiner.*